United States Patent [19]

Krist et al.

[11] Patent Number: 5,615,015

[45] Date of Patent: Mar. 25, 1997

[54] APPARATUS AND METHOD OF PROGRAMMING A JOB TO BE PROCESSED AT A LOCATION OTHER THAN THE LOCATION AT WHICH THE JOB IS PREPARED

[75] Inventors: Peter M. Krist, Rochester; Wayne Cheng, Fairport, both of N.Y.

[73] Assignee: Xerox Corporation, Stamford, Conn.

[21] Appl. No.: 283,372

[22] Filed: Aug. 1, 1994

[51] Int. Cl.$^6$ .............................. H04N 1/23; H04N 1/00; G06F 15/00

[52] U.S. Cl. .................... 358/296; 358/401; 395/114

[58] Field of Search ............................. 358/296, 401, 358/403, 407, 434, 442, 468; 355/202; 395/101, 112, 114, 115, 116

[56] References Cited

U.S. PATENT DOCUMENTS

| | | | |
|---|---|---|---|
| 5,130,806 | 7/1992 | Reed et al. | 358/296 |
| 5,170,340 | 12/1992 | Prokop et al. | 364/143 |
| 5,212,786 | 5/1993 | Sathi | 395/600 |
| 5,226,112 | 7/1993 | Mensing et al. | 395/114 |
| 5,402,527 | 3/1995 | Bigby et al. | 395/101 |
| 5,450,571 | 9/1995 | Rosekrans et al. | 395/112 X |
| 5,467,434 | 11/1995 | Hower, Jr. et al. | 395/114 |
| 5,475,801 | 12/1995 | Brindle et al. | 395/114 |

*Primary Examiner*—Eric Frahm
*Attorney, Agent, or Firm*—Gary B. Cohen

[57] ABSTRACT

A printing system, including a user interface for programming an electronic job ticket with a plurality of instructions to process a first electronic document, is provided. The printing system further includes an emitter for converting the first electronic document, with the electronic job ticket, into a second electronic document written in a page description language, the second electronic document including respective page description language representations of a selected instruction and a selected electronic page. The second electronic document is transmitted from the emitter to a printing machine where the second electronic document is interpreted with a job decomposer to create an output-ready document. In practice, the decomposer performs an image processing operation, on the page description language representation of the selected electronic page, with the page description language representation of the selected instruction of the second electronic document.

27 Claims, 18 Drawing Sheets

APPARATUS AND METHOD OF PROGRAMMING A JOB TO BE PROCESSED AT A LOCATION OTHER THAN THE LOCATION AT WHICH THE JOB IS PREPARED

BACKGROUND OF THE INVENTION

The present invention relates generally to a technique for processing a network job in a printing system and, more particularly to a method of performing an image processing operation on the network job at a printing machine, the printing machine being disposed remotely of an input source at which the network job was developed.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the IIT from, among other sources, a network or a scanner. An example of an IIT with both network and scanner inputs is found in the following patent, the pertinent portions of which are incorporated herein by reference:

U.S. Pat. No. 5,170,340

Patentees: Prokop et al.

Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language ("PDL") is captured, decomposed and stored for printing. As is known, a network job can have its origin in a remote client, such as a workstation, or a print server with a storage device. In either case, jobs provided at the IIT are preferably stored in a mass memory, such as the multiple disk arrangement disclosed by the following patent:

U.S. Pat. No. 5,212,786

Patentee: Sathi

Issued: May 18, 1993

In one contemplated embodiment of a network printing arrangement, such as the DocuTech® network printing system, a user develops an electronic document, with a plurality of electronic pages and an electronic job ticket, at the remote client. In developing the electronic document, image data may be generated and necessary image processing operations, such as halftoning, scaling, resolution conversion, translation and cropping, are performed on the image data. Additionally, various appropriate instructions, intended for, among other things, use in printing the electronic document, are provided through programming of the job ticket. In practice, both the image data and instructions are converted, with an emitter or driver, to a master written in a PDL, such as Interpress, Postscript or PCL. The electronic document is then transmitted to the DocuTech® electronic printer where the electronic document is printed in accordance with the instructions.

The following patent, the pertinent portions of which are incorporated herein by reference, relates to transmitting a network job, with comment messages, to an electronic printer:

U.S. Pat. No. 5,130,806

Patentees: Reed et al.

Issued: Jul. 14, 1992

U.S. Pat. No. 5,130,806 discloses a technique in which a remote user sends a message with a print job to a reprographic system. In one example, the message is displayed at a user interface, of the reprographic system, for providing a system operator with information regarding the job, such as a manner in which the job is to be printed and/or finished. In another example, the message is employed to fault the job until the system operator acknowledges receipt of the message.

It will be further noted that, under certain circumstances, the DocuTech® network printing system performs image processing functions for a network print job. For example, if the remote client transmits a print job with a resolution of 300 spi, the DocuTech® will convert the resolution to 600 spi, automatically, for purposes of printing. Moreover, the DocuTech will automatically rotate an image, from a remote client, to fit the image on an available print media sheet.

While U.S. Pat. No. 5,130,806 discloses an approach for facilitating operation of a printing system by transmitting a message, across a network, to an electronic printer, it does not contemplate an approach in which image processing is performed at the electronic printer by reference to an instruction received from a remote client. Moreover, the DocuTech® performs image processing automatically in a manner that is transparent to the network client. It would be desirable to provide an arrangement in which a network client could request image processing at a remote printer by way of a PDL instruction programmed explicitly by the network client.

The present invention employs network capability to achieve various advantageous ends. The following discussion is intended to provide a background for any appropriate network implementation required by the disclosed embodiment below.

Examples of some recent patents relating to network environments of plural remote terminal shared users of networked printers include Xerox Corporation U.S. Pat. Nos. 5,243,518, 5,226,112, 5,170,340 and 5,287,194. Some patents on this subject by others include U.S. Pat. Nos. 5,113,355, 5,113,494 (originally filed Feb. 27, 1987), 5,181,162, 5,220,674, 5,247,670; 4,953,080 and 4,821,107. Further, by way of background, some of the following Xerox Corporation U.S. patents also include examples of networked systems with printers: U.S. Pat. Nos. 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Also noted are IBM Corp. U.S. Pat. Nos. 4,651,278 and 4,623,244, and Canon U.S. Pat. No. 4,760,458 and Jap. Pub. No. 59-63872 published Nov. 4, 1984. Some of these various above patents also disclose multi-functional or integral machines [digital scanner/facsimile/printer/copiers] and their controls.

Some other network system related publications include "Xerox Office Systems Technology" "... Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Informations System, A New Personal Computer ..."; "Xerox System Integration Standard Printing Protocol XSIS 118404", April 1984; "Xerox Integrated Production Publishers Solutions: ..." Booklet No. "610P50807" "11/85"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress: The Source Book", Simon & Schuster, Inc., New York, N.Y., 1988, by Harrington, S. J. and Buckley, R. R.; Adobe Systems Incorporated "PostScript® Language Reference Manual", Addison-Wesley Co., 1990; "Mastering Novell® Netware®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87" "The Network Computing Architecture and System: An Environment for Developing Distributed Applications", T. H. Dineen, et al., Usenix Conference Proceedings, June 1987.

Noted regarding commercial network systems with printers and software therefor is the 1992 Xerox® Corporation "Network Publisher" version of the 1990 "DocuTech®" publishing system, including the "Network Server" to customer's Novell® 3.11 networks, supporting various different network protocols and "Ethernet"; and the Interpress Electronic Printing Standard, Version 3.0, Xerox System Integration Standard XNSS 048601 (January 1986). Also, the much earlier Xerox® Corporation "9700 Electronic printing System"; the "VP Local Laser Printing" software application package, which, together with the Xerox® "4045" or other Laser Copier/Printer, the "6085" "Professional Computer System" using Xerox Corporation "ViewPoint" or "GlobalView®" software and a "local printer [print service] Option" kit, comprises the "Documenter" system. The even earlier Xerox® Corporation "8000" "Xerox Network Services Product Descriptions" further describe other earlier Xerox® Corporation electronic document printing systems. Eastman Kodak "LionHeart™" systems, first announced Sep. 13, 1990, are also noted. Current popular commercial published "systems software" including LAN workstation connections includes Novell® DOS 7.0, "Windows™" NT 3.1, and IBM OS/2 Version 2.1.

SUMMARY OF THE INVENTION

In accordance with one aspect of a disclosed embodiment of the present invention, there is provided a method including: programming an electronic job ticket with a plurality of instructions, for processing a first electronic document, a selected one of the instructions corresponding with an image processing operation to be performed on a selected one of the electronic pages; using an emitter to convert the first electronic document, with the electronic job ticket, into a second electronic document written in a page description language, the second electronic document including respective page description language representations of the selected instruction and the selected electronic page; transmitting, by way of a network connection, the second electronic document to a printing machine; interpreting the second electronic document at the printing machine to create an output-ready document, said interpreting including performing the image processing operation, on the page description language representation of the selected electronic page, with the page description language representation of the selected instruction of the second electronic document; and outputting a representation of the interpreted second electronic document at the printing machine.

In accordance with another aspect of the disclosed embodiment of the present invention, there is provided a method including: programming an electronic job ticket with a plurality of instructions, for processing a first electronic document, a selected one of the instructions corresponding with an image processing operation to be performed on a selected one of the electronic pages; using an emitter to convert the first electronic document, with the electronic job ticket, into a second electronic document written in a page description language, the second electronic document including respective page description language representations of the selected instruction and the selected electronic page; editing the second electronic document for altering the page description language representation of the first selected instruction to a page description representation of a second selected instruction; transmitting, by way of the network connection, the second electronic document to a printing machine; interpreting the second electronic document at the printing machine to create an output-ready document, said interpreting including performing the image processing operation, on the page description language representation of the selected electronic page, with the page description language representation of the second selected instruction of the second electronic document; and outputting a representation of the interpreted second electronic document at the printing machine.

In accordance with yet another aspect of the disclosed embodiment of the present invention, there is provided a printing system with an input source communicating with a printing machine by way of a network connection, the printing machine including an image processing arrangement for performing one or more image processing operations, the input source including an emitter in which a first electronic document, represented by a plurality of electronic pages, is prepared for an output operation at the printing machine, including: a user interface for programming an electronic job ticket with a plurality of instructions to process the first electronic document, a selected one of the instructions corresponding with an image processing operation to be performed on a selected one of the electronic pages; an emitter for converting the first electronic document, with the electronic job ticket, into a second electronic document written in a page description language, the second electronic document including respective page description language representations of the selected instruction and the selected electronic page; a transmitter for transmitting the second electronic document from the emitter to the printing machine; and a job decomposer for interpreting the second electronic document at the printing machine to create an output-ready document, the job decomposer performing the image processing operation, on the page description language representation of the selected electronic page, with the page description language representation of the selected instruction of the second electronic document, wherein the printing machine outputs a representation of the interpreted second electronic document.

These and other aspects of the invention will become apparent from the following description, the description being used to illustrate a preferred embodiment of the invention when read in conjunction with the accompanying drawings.

BRIEF DESCRIPTION OF THE DRAWING

FIG. 9 is a view depicting an exemplary job programming ticket and job scorecard displayed on the User Interface (UI) touchscreen of the printing system shown in FIG. 1;

FIG. 15 is an elevational view of an 8.5×14 electronic input page scaled isomorphically, with a scaling factor of 0.78, to produce a corresponding image on an 8.5×11 print media sheet;

FIG. 18 is an elevational view of a 10.76×14 electronic input page scaled isomorphically, with a scaling factor of 0.78, to produce a corresponding image on an 8.5×11 print media sheet.

DESCRIPTION OF THE PREFERRED EMBODIMENT(S)

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
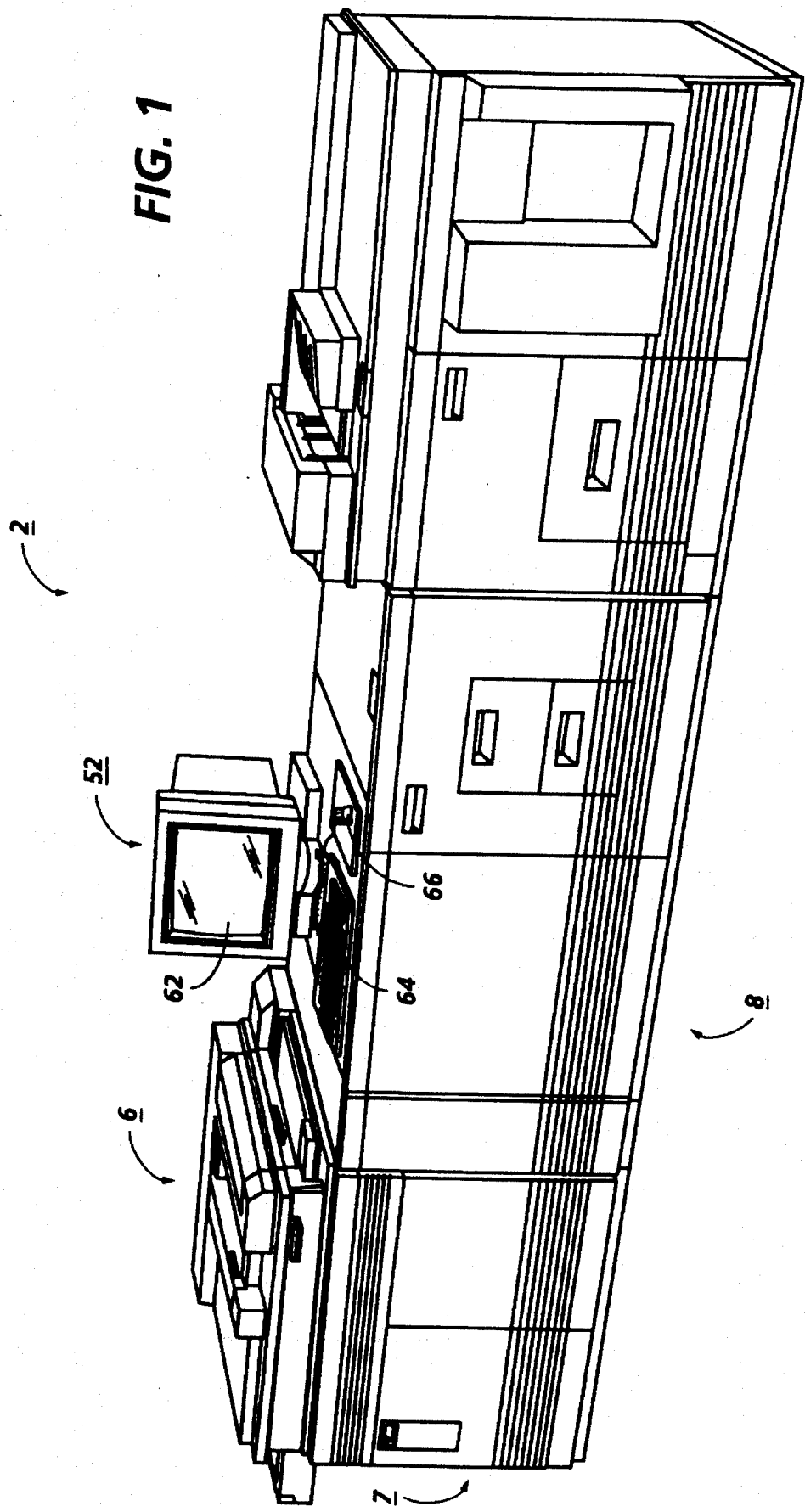
FIG. 1 is a perspective view an electronic printing system incorporating the printing materials cost estimating approach of the present invention.
Figure 2:
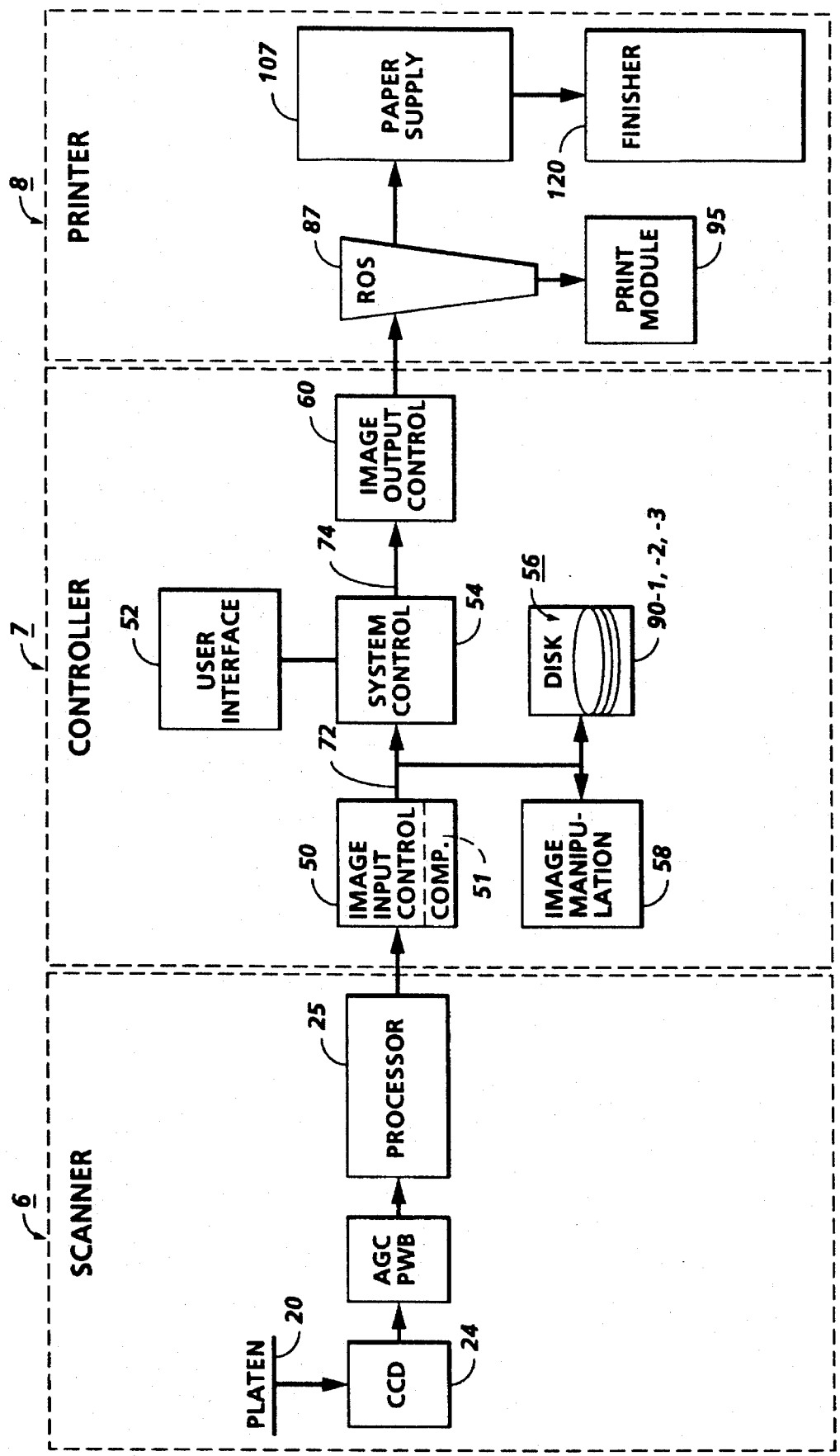
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
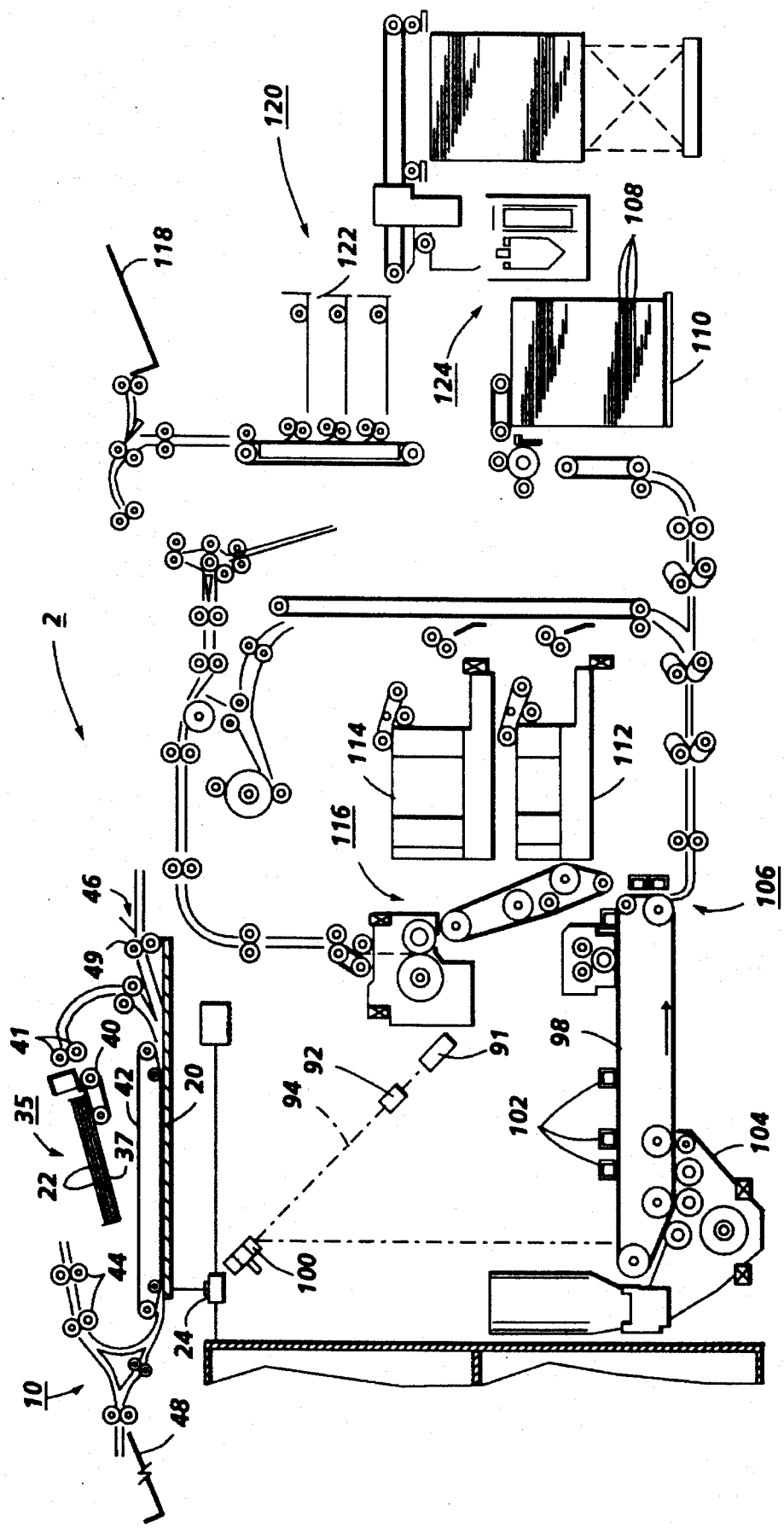
FIG. 3 is an elevational view illustrating the principal mechanical components of the printing system shown in FIG. 1.
Figure 4:
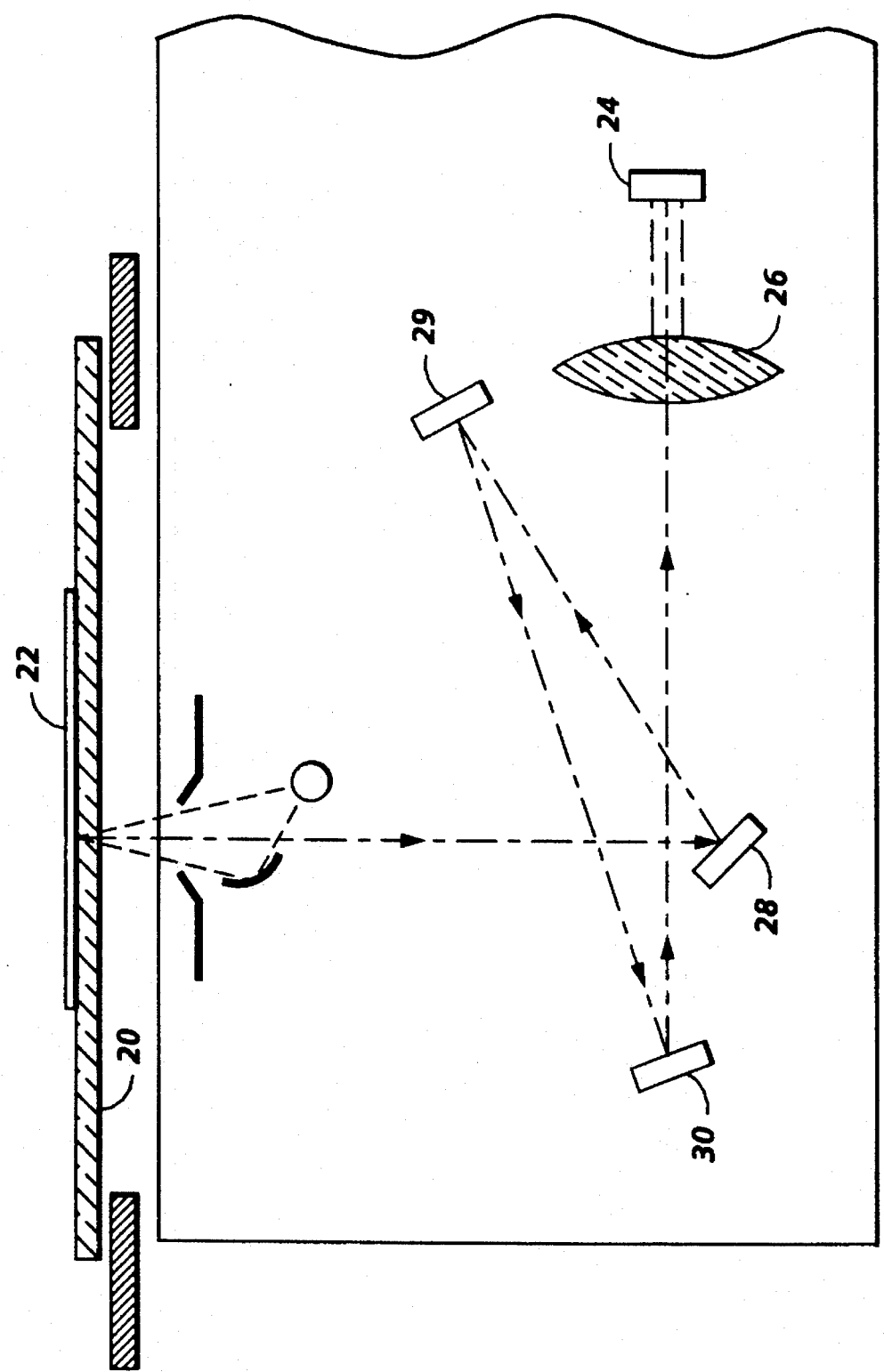
FIG. 4 is a schematic view showing certain construction details of the document scanner for the printing system shown in FIG. 1.

Referring particularly to FIGS. 2–4, scanner section 6 incorporates a transparent platen 20 on which the document 22 to be scanned is located. One or more linear arrays 24 are supported for reciprocating scanning movements below platen 20. Lens 27 and mirrors 28, 29, 30 cooperate to focus array 24 on a line like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 87 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Figure 5:
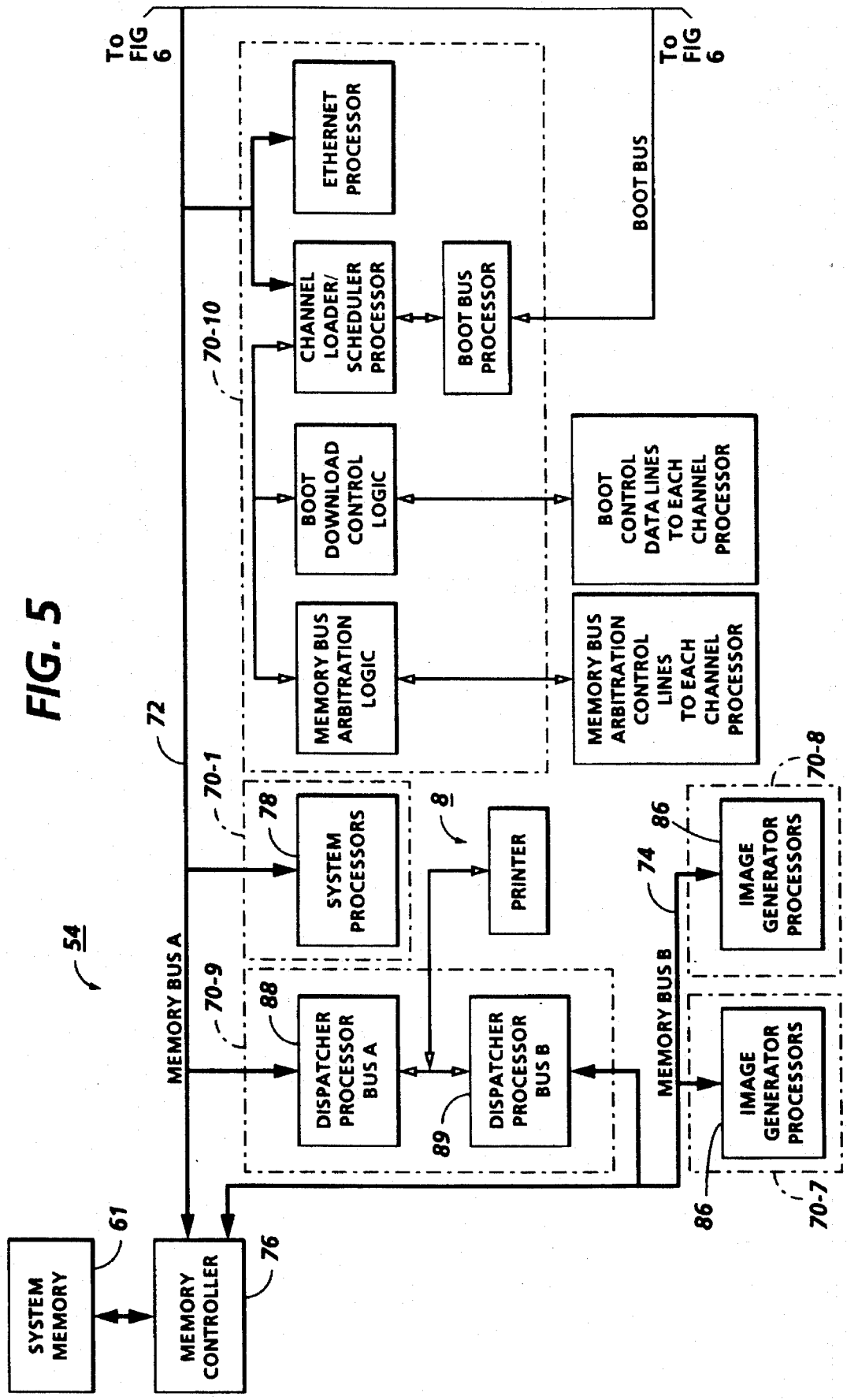
FIGS. 5–7 comprise a schematic block diagram showing the major parts of the control section for the printing system shown in FIG. 1.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Figure 6:
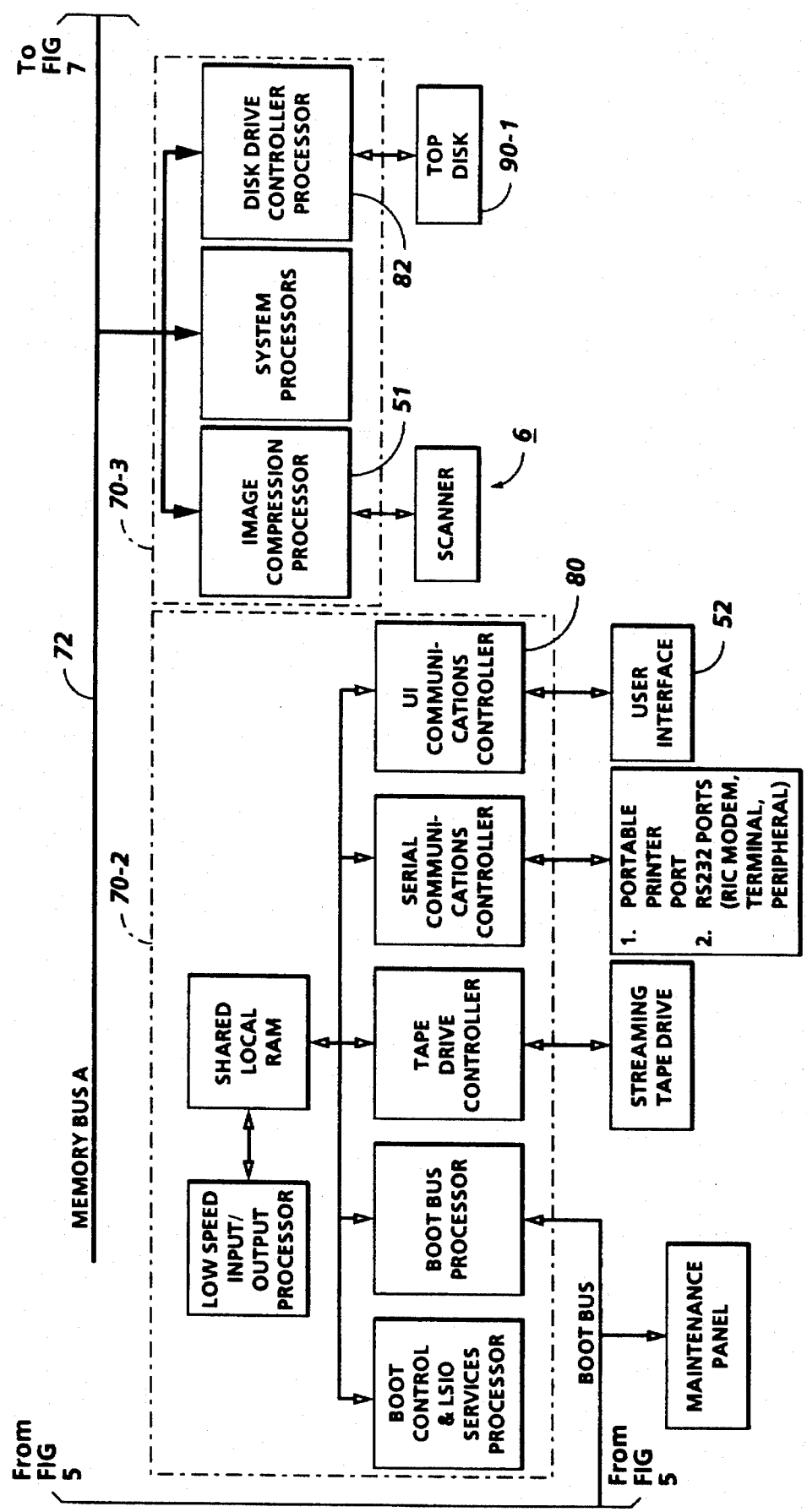
Figure 7:
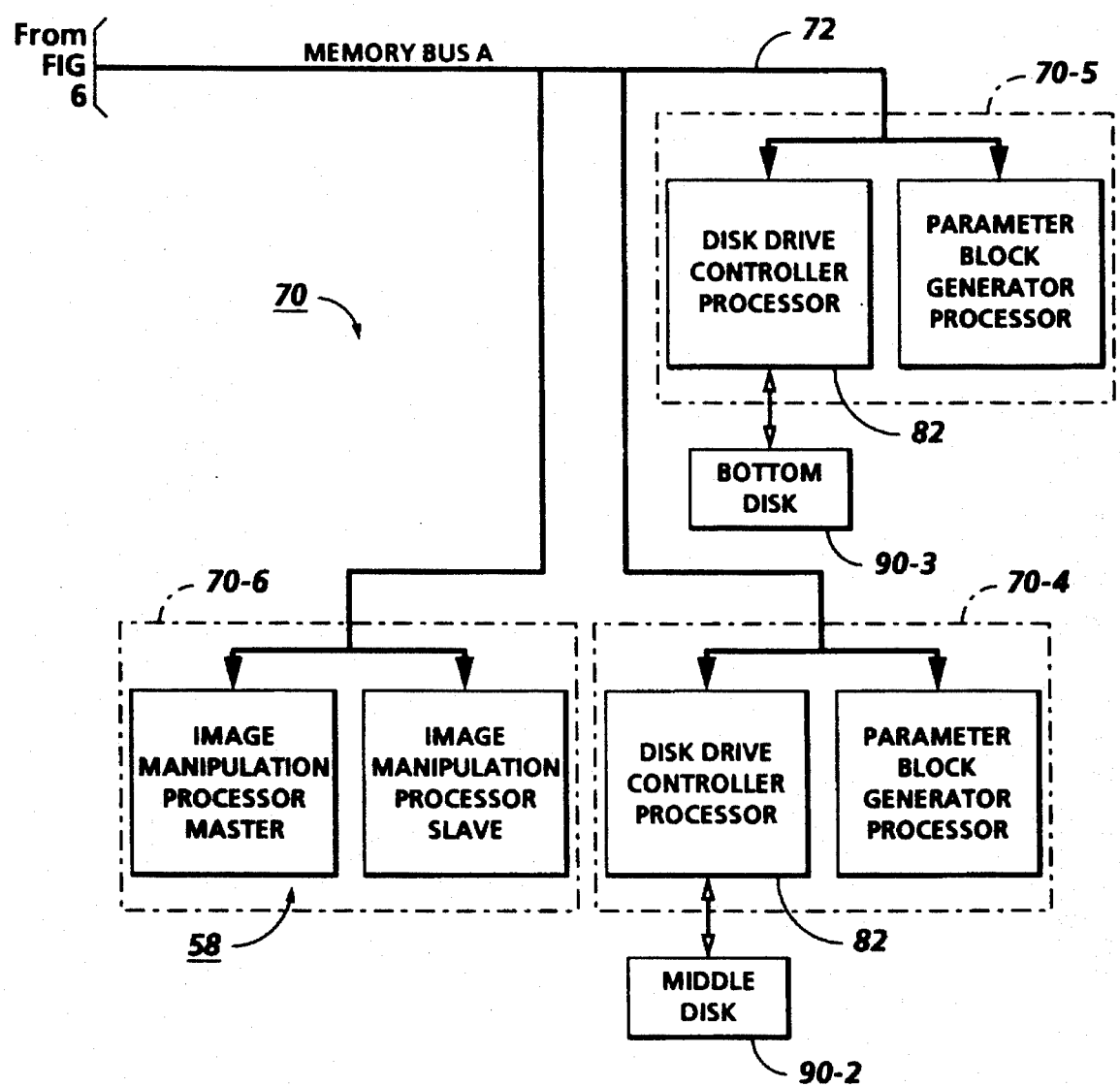

Referring particularly to FIGS. 5–7, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses, 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section dispatch processor PWB 70-9 having dispatch processors 88, 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 (FIG. 9) to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 8:
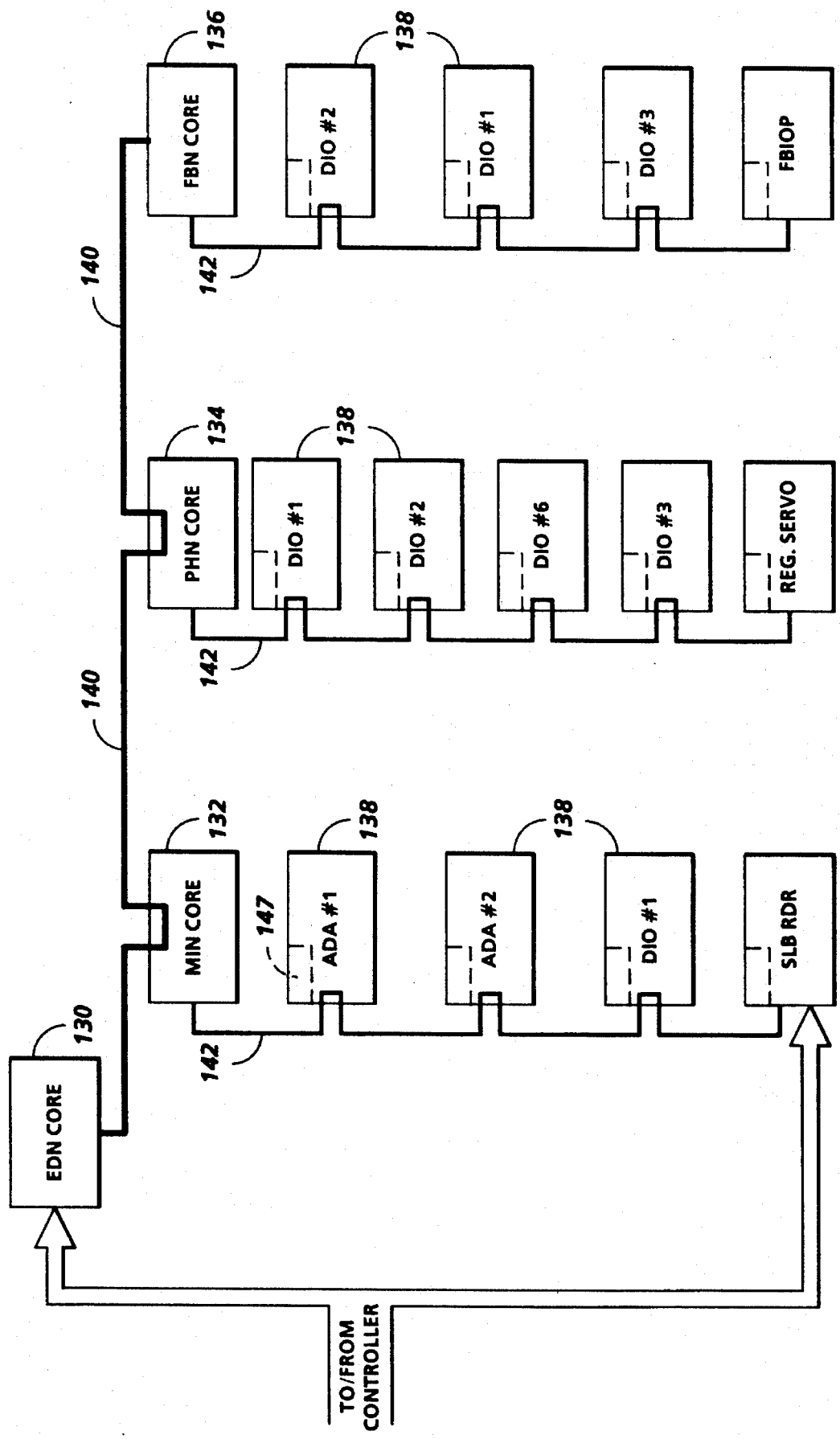
FIG. 8 is a block diagram of the Operating System, together with Printed Wiring Boards and shared line connections for the printing system shown in FIG. 1.

Referring particularly to FIG. 8, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Figure 9:
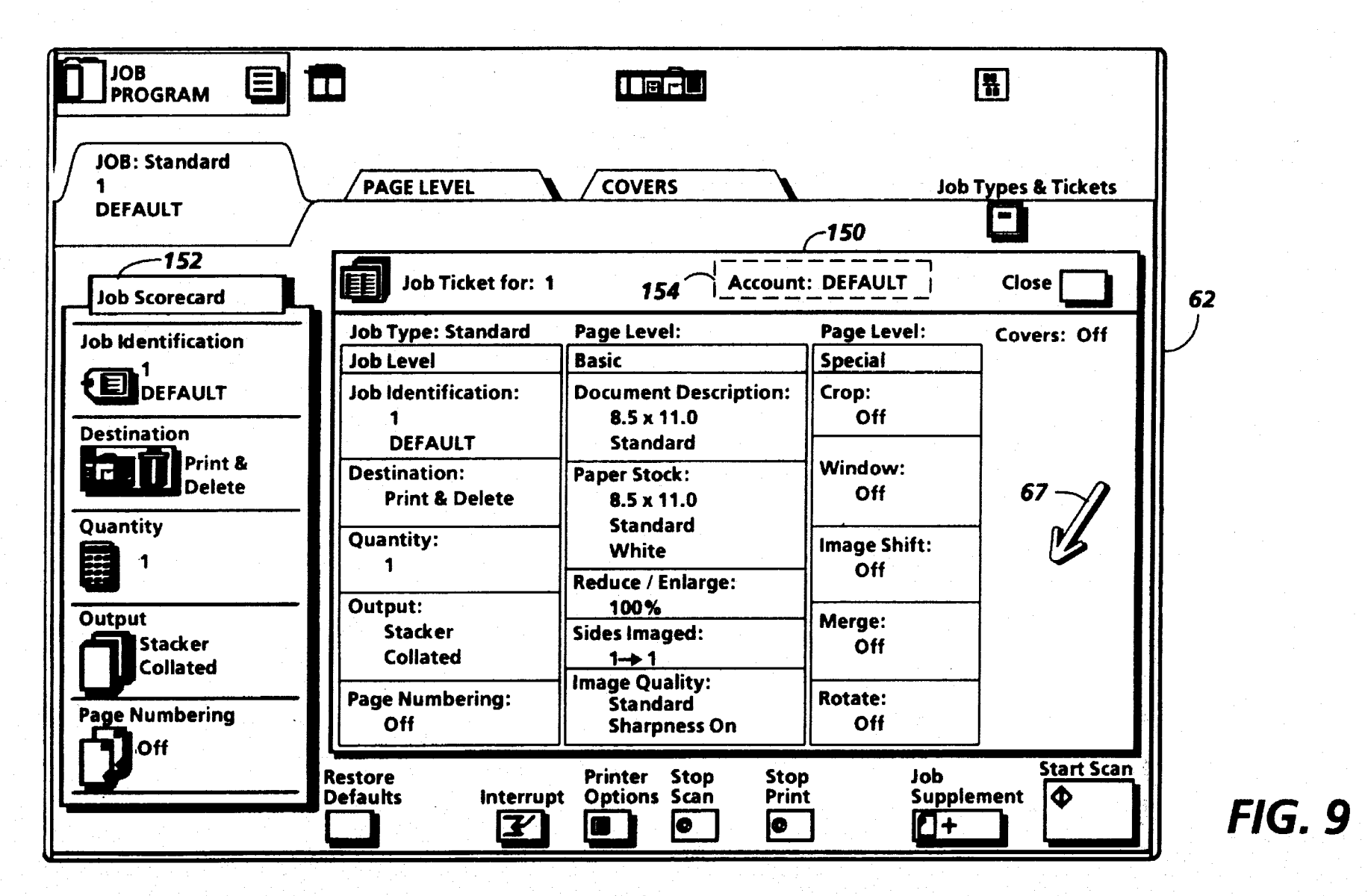

Referring to FIG. 9, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job. The account 154 for the print job is the default account in FIG. 9. Thus, the preprogrammed billing rates for the various functions will be tabulated for the specific print job, unless a particular account with corresponding billing rates is specified by the system operator.

Figure 10:
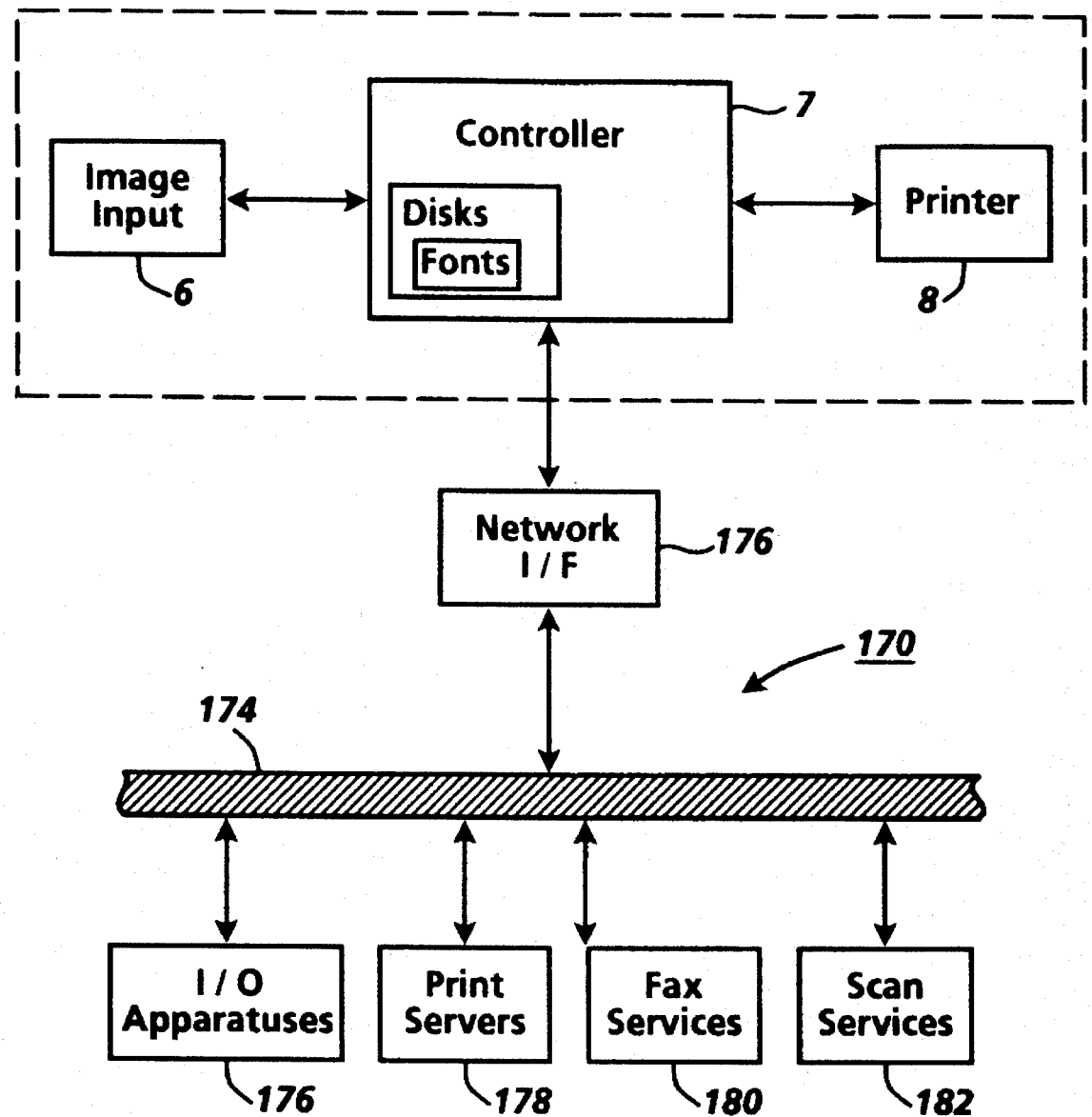
FIG. 10 is a block diagram of the printing system of FIG. 2 adapted for use in a network context.

Referring to FIG. 10, the controller 7 is coupled with a network arrangement 170 by way of a network interface 172. The network interface 172 includes all of the hardware and software necessary to relate the hardware/software components of the controller 7 with the hardware/software components of the network arrangement 170. For instance, to interface various protocols between the server and the network arrangement, the network interface could be provided with, among other software, Netware® from Novell Corp.

In the network arrangement 170, various I/O and storage devices are interconnected with a bus 174. In particular, the devices include, among others the following: I/O Apparatuses 176, Print Services 178, Scan Services 180 and FAX Services 182. In the present example a given I/O Apparatus includes a workstation, such as any suitable PC compatible apparatus or a 6085 workstation manufactured by Xerox Corporation.

In one embodiment, the printing system 2 is a DocuTech® Network Printing System ("Network Printer") which prints jobs transmitted from one of the I/O apparatuses 176. In one embodiment, the Network Printer processes network jobs written in a page description language ("PDL") known as "Interpress" and as a prerequisite to printing the network job, the Network Printer decomposes the job from a high level primitive form to a lower level primitive form. The decomposition process is discussed in further detail in U.S. application Ser. No. 07/898,761 entitled "Apparatus and Method for Multi-Stage/Multi-Process Decomposing", filed on Jun. 12, 1992, by Bonk et al., the pertinent portions of which are incorporated herein by reference. In another embodiment the Network Printer is used, in conjunction with a DocuTech® Network Server, see Print Services 178, to print jobs written in, among other PDLs, Postscript®. The structure and operation of the DocuTech® Network Server may be more fully comprehended by reference to U.S. Pat. No. 5,226,112 to Mensing et al., the pertinent portions of which are incorporated herein by reference. Decomposed jobs are commonly stored, for output, in a job file of the Network Printer and later transferred to a print queue for printing. Further discussion of a printing system with a job file and a print queue is provided in U.S. Pat. No. 5,206,735 to Gauronski et al., the pertinent portions of which are incorporated herein by reference.

Preferably, one of the Scan Services 180 includes a workstation and a scanner, provided in the form of a package. This sort of package is made available by Xerox Corporation in the form of a WG40 scanner coupled with a 6085 workstation. It will be appreciated that the Scan Service is preferably provided with Optical Character Recognition ("OCR") capability so that the user of the controller 7 can scan hard-copy, such as a sheet referred to as "Paper UI", for use by the controller 7. As is known, the Paper UI can be used to provide a controller with appropriate directives, regarding a job, such as printing instructions. An example of Paper UI, and its application can be obtained by reference to U.S. Patent No. to [OBTAIN REFERENCE FROM PARC].

The FAX Service 182 assumes the form of any suitable networked FAX device, such as the LAN FAX Service manufactured by Xerox Corporation under the 7032 series. Details regarding the coupling of a FAX component with a printing system can be found in U.S. Pat. No. 4,821,107 to Naito et al., the pertinent portions of which are incorporated herein by reference.

Figure 11:
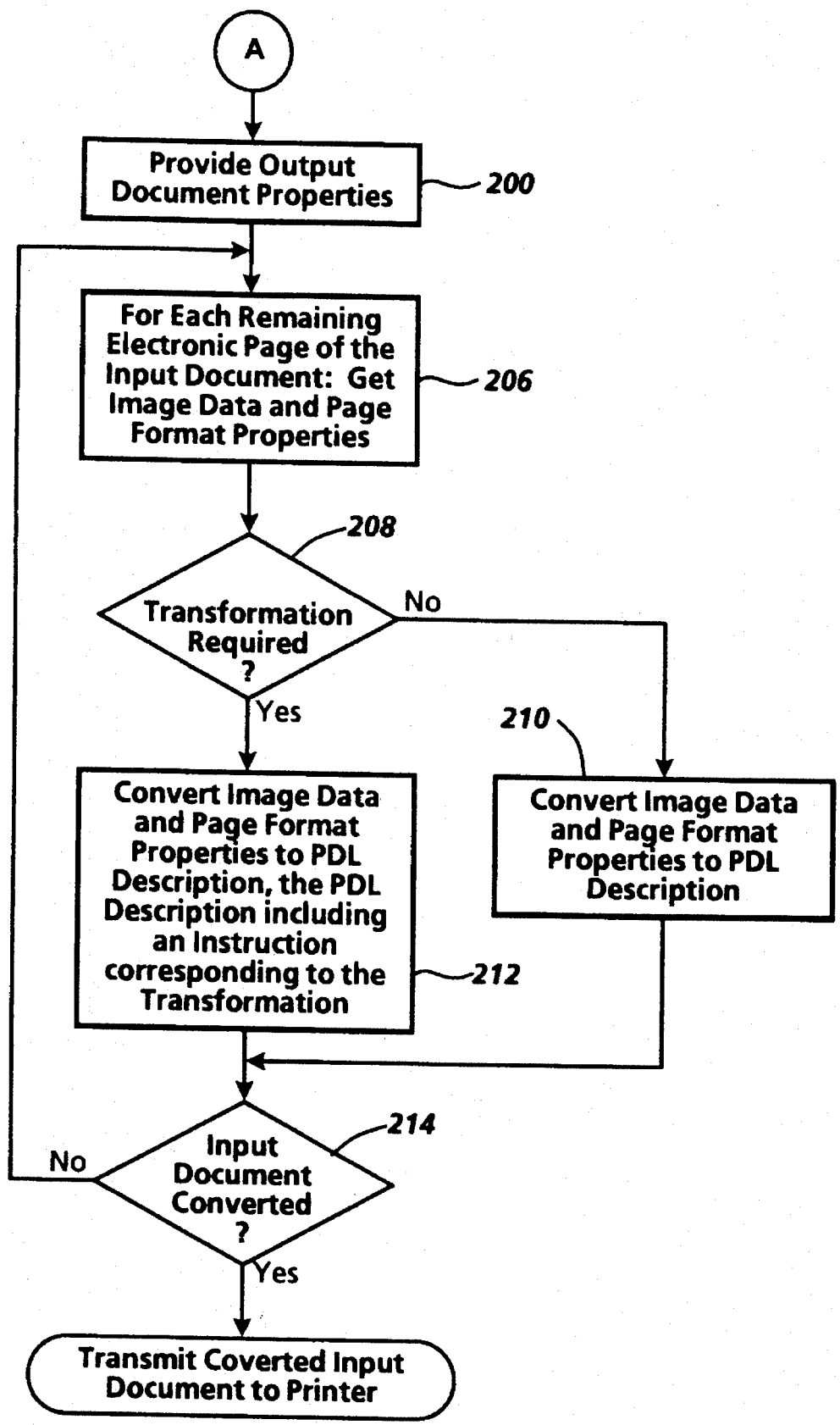
FIG. 11 is a flow diagram illustrating a manner in which an emitter converts an input document, with one or more image processing related instructions, into a page description language ("PDL") description, for processing the input document at the printing system, the printing system being disposed remotely of the emitter.

Referring to FIG. 11, a method, which permits the user of one of the I/O apparatuses to exploit the image processing capability of the printing system 2 is discussed in detail. Initially, at step 200, a client user, preferably disposed remotely of the printing system 2, is provided with information, from the printing system regarding properties for one or more output pages. In one example, such properties would include stock sizes available at the printer. This information can be obtained in various ways. In one example, a commercially available software package, such as that made available by Hewlett-Packard Co., would be used to query the printer regarding the stock sizes loaded in its trays. In another example, a current version of the DocuTech® printing system would be employed to obtain stock information since such system is capable of providing a remote client with information regarding the stock sizes loaded in its trays. In yet another example, a stock status querying technique for a network printing system could be implemented readily by reference to the following printing protocol, the pertinent portions of which are incorporated herein:

Xerox System Integration Standard Printing Protocol XNSS 119005

Xerox Corporation, Stamford Conn. May, 1990

Figure 12:
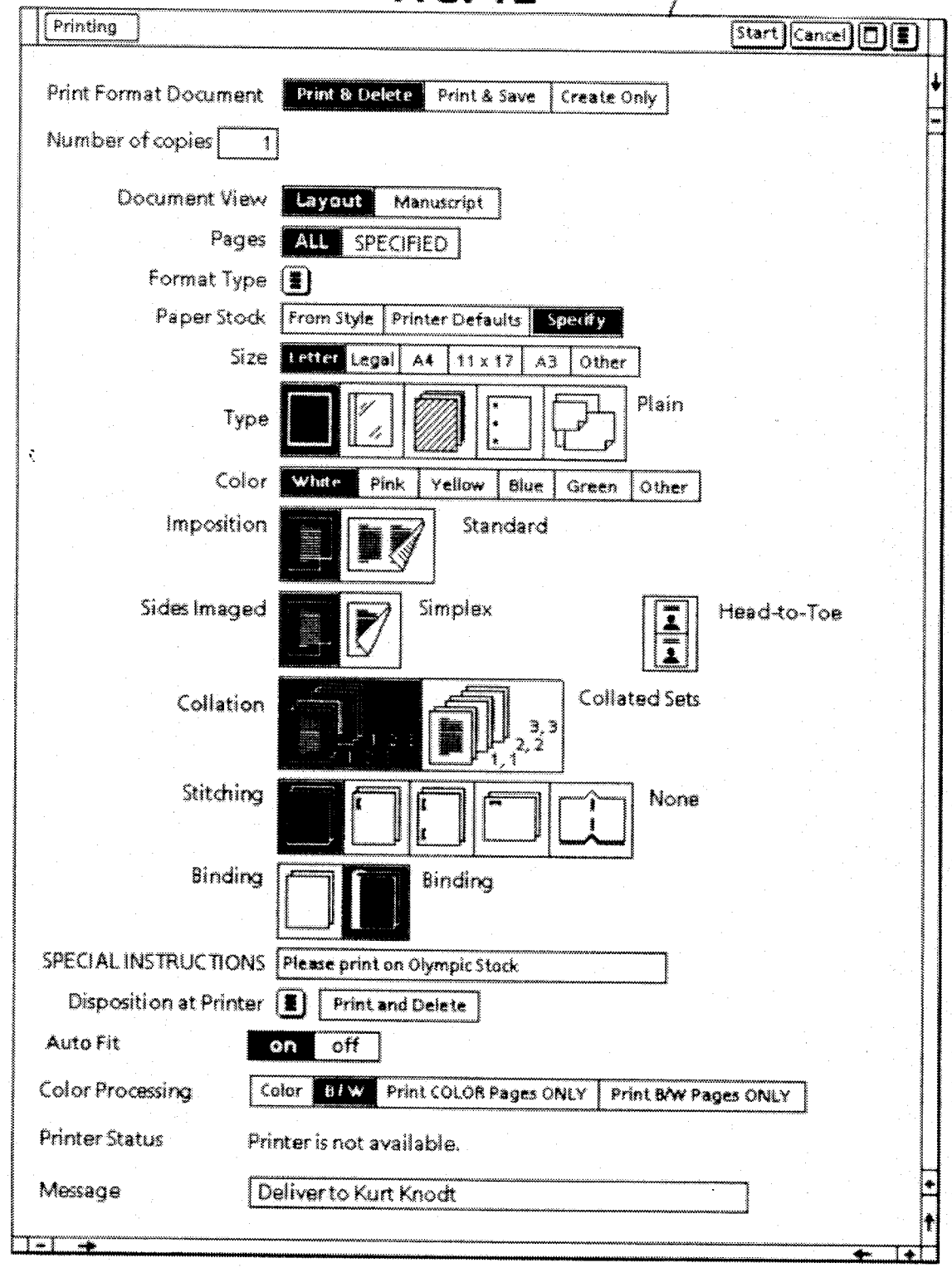
FIG. 12 is an elevational view of a display screen with a dialog, for choosing printing properties of an output document, the output document being representative of the input document.

Referring to FIG. 12, a screen 202 for obtaining information about the properties of the one or more output page properties is shown. While the illustrated dialog of FIG. 12 shows all of the output pages as being letter size, it will be understood that the "SPECIFIED" box of "Pages" could be selected and another size for a range of pages could be set.

In the preferred embodiment, one or more pages of an input document or job are programmed, at one of the workstations 176, with an image processing instruction. In particular, referring to FIG. 13, the one or more pages are programmed with a screen 204. It will be appreciated by those skilled in the art that the dialogs of FIGS. 12 and 13 could be combined into a single dialog without altering the concept upon which the preferred embodiment is based. While screen 204 can be used to program multiple input pages, in the current description, for ease of discussion, only the programming of a single page will be described. In a working example of the preferred embodiment, which will be used to clarify the steps of FIG. 11, when appropriate, an image processing operation for a single page, such as a reduction from 8.5×14 to 8.5×11, is programmed by setting page size at 8.5×14 (FIG. 13) and selecting the "Reduce" box. As will appear, this programming provides certain vital information to an emitter of the workstation 176. In one example, the emitter comprises a GVX™ emitter, manufactured by Xerox Corporation or an Aldus PageMaker™ emitter. As will be discussed further, the emitter is preferably adapted to convert an instruction, corresponding with an image processing operation, into a PDL directive; however, the present technique, as will appear below, can accommodate for an emitter which does not provide for such conversion.

Referring again to FIG. 11, and, more specifically, step 206, for each page of the input document, image data, which is preferably developed at the workstation or other suitable network input (e.g. scan services 180 of FIG. 10), and page format properties, which can be obtained from information inputted by way of screens 202 and 204, are transmitted to the emitter. Because of the information entered by way of screens 202, 204, the emitter knows whether an image processing operation, such as reduction/enlargement, rotation, halftoning, is required at a remote printer, e.g. the printing system 2 (FIG. 10).

Referring to step 208, a determination is made as to whether a transformation (e.g. a reduction operation) is requested. For those pages in which a remote image processing request is not input (step 210), the emitter will simply convert the corresponding image data and page format properties into a page description language ("PDL") description. As mentioned above, the PDL can assume various commercially available forms. For those pages in which a remote image processing is input (step 212), the instruction, corresponding to the image processing, is converted into PDL description for use by the printing system 2.

In the working example, when the programmed page is encountered at step 208, the emitter is able to determine, from the information entered via the screens 202, 204, that a reduction of an 8.5×14 input page to an 8.5×11 output page is required. Accordingly, a PDL instruction, calling for such reduction at the remote printing system 2, is developed at the emitter. An approach for optimizing this sort of reduction is discussed in further detail below.

At step 214, a check is performed to determine if all of the input document has been converted to a PDL description. As soon as the conversion process for the input document is complete, the converted input document is transmitted to the printing system 2 for eventual processing thereof. Preferably, the job is interpreted at the printing system so that the PDL description is submitted to preparsing and coalescing processes. During the preparsing process, the printing/finishing instruction(s) are separated from the image data and the fonts are bound with the document or job. It will be appreciated that outline fonts are preferably used to implement the disclosed embodiment when such embodiment is used for reduction or enlargement. Along with preparsing and coalescing, the job is postparsed so that it is placed into an appropriate format for consumption by a marker.

In the above-discussed illustrated embodiment of FIG. 11, a client may manually program one or more pages for reduction and/or enlargement. Referring to FIG. 12, it should be recognized that such programming, for reduction and/or enlargement could be obtained automatically with the emitter. More particularly, as was assumed above, the emitter accesses the dialog of FIG. 12 for information regarding output document properties. In an automatic approach, the dialog would include a selectable option known as "Auto-Fit". When selected or enabled, this option would notify the emitter that a job is to be processsed with the algorithm of FIG. 11. That is, while converting a job into a PDL, the emitter would, in response to the Auto-Fit prompt, examine each page for any inconsistency in requested stock size, relative to the output document property ("Size") set in the dialog of FIG. 12. If the designated input stock size, for a given input page, did not conform with that set in the dialog, preferably, the emitter would generate a PDL instruction calling for a suitable scaling operation to be performed for that given page, pursuant to interpretation, at a remote printer. Such scaling operation would conform the size of the given input page with that called for by the dialog of FIG. 12. The advantage of this auto-fit approach is that it reduces the amount of programming required of the client.

Figure 13:
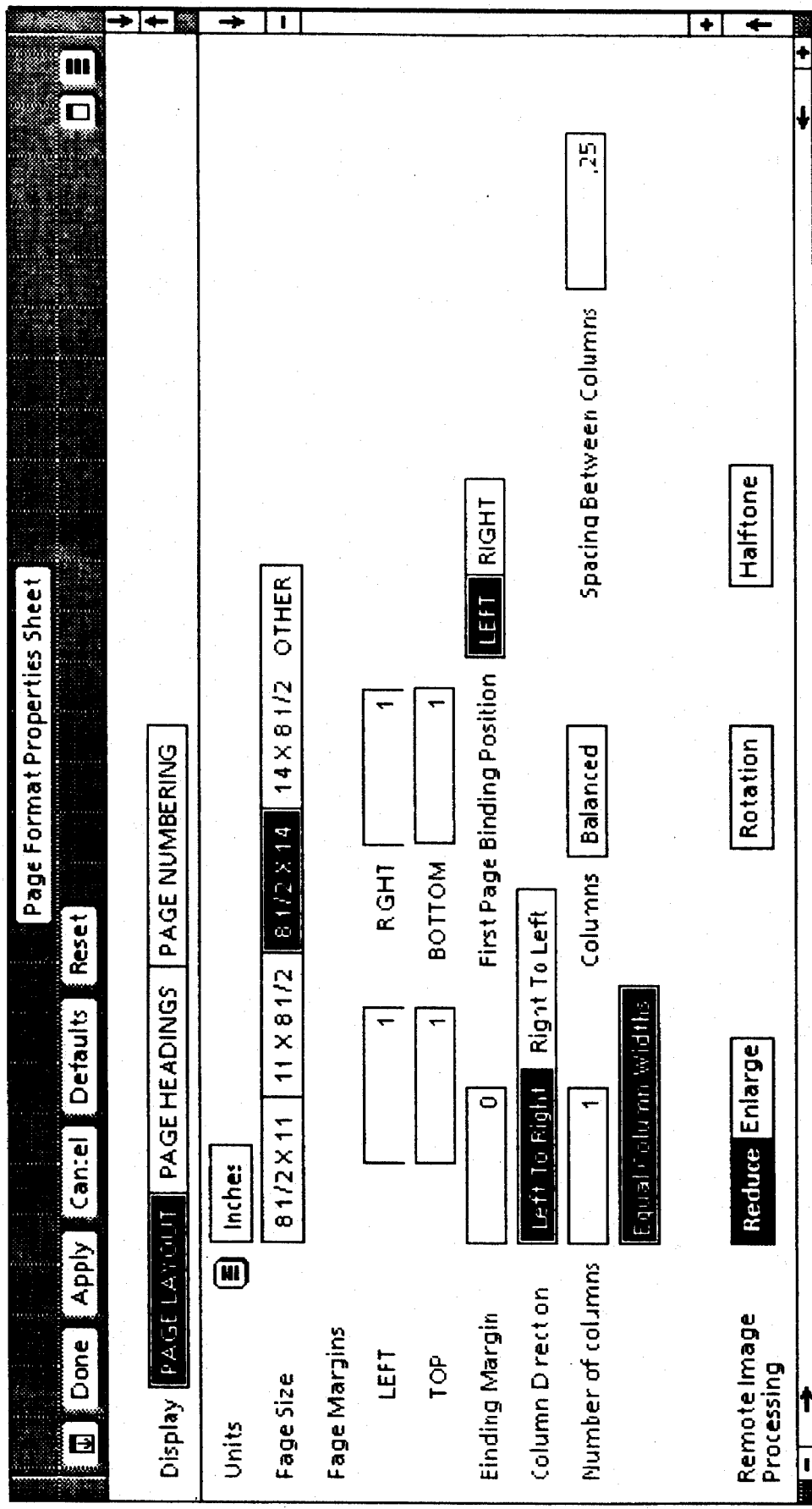
FIG. 13 is an elevational view of a display screen, with a dialog, for programming one or more pages of the input document with image processing instructions.
Figure 14:
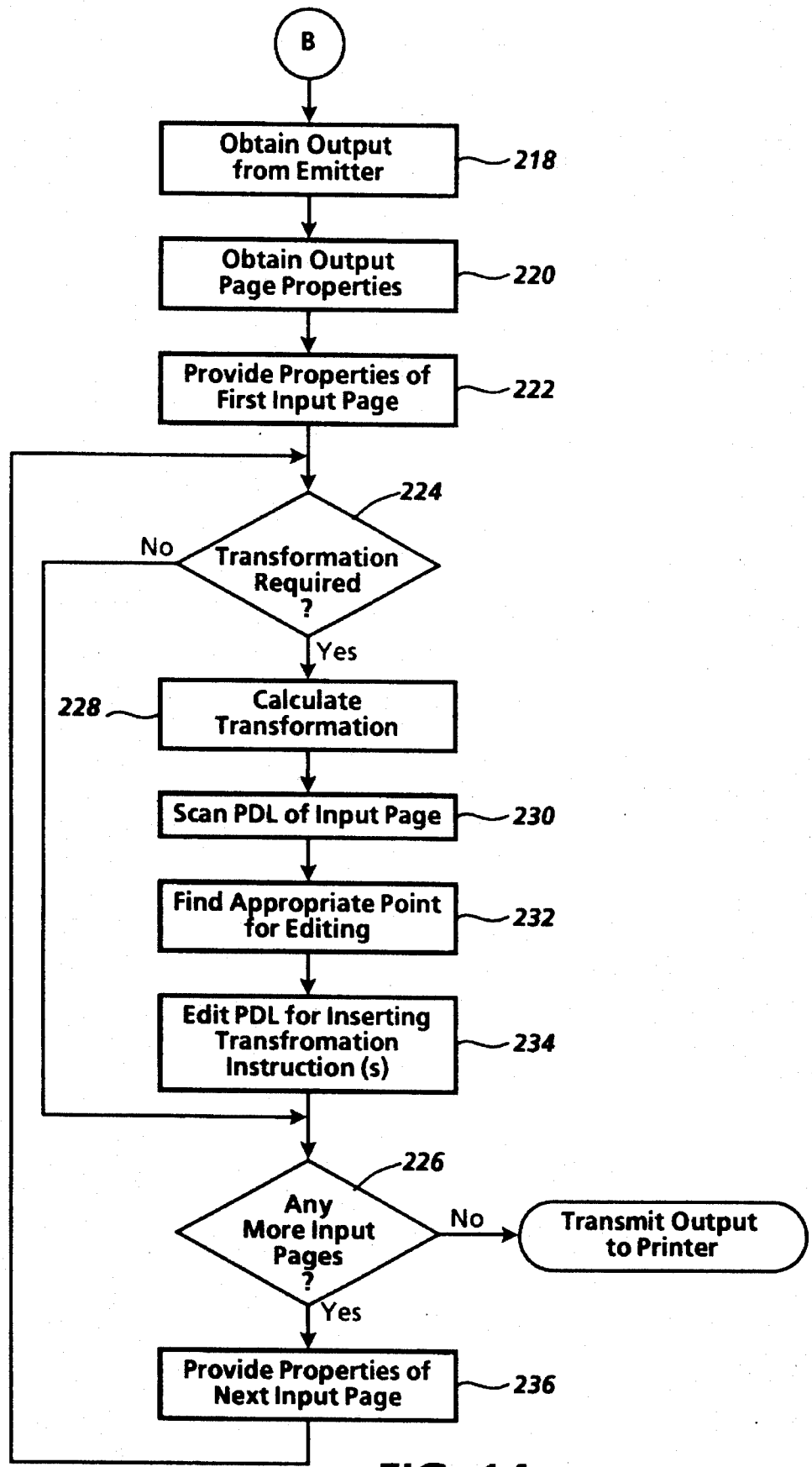
FIG. 14 is a flow diagram illustrating a manner in which PDL representations of image processing instructions are edited.

The illustrated embodiment of FIGS. 11–13 assumes that the emitter is adapted to respond to image-processing instructions provided by a client user. An embodiment which does not make such assumption is shown in FIG. 14. In particular, for the illustrated embodiment of FIG. 14, the job cannot be programmed directly for remote printing by the client user. Accordingly, at one of the I/O apparatuses 176, a programmed job, written in, for example, Interpress, is copied to a suitable operating system environment, such as a UNIX environment provided in a Sun workstation designed for Xerox Corporation. In turn, the emitter converts the job to a PDL description with default image processing attributes. In the embodiment of FIG. 14, a stream editor is used to alter selected PDL representations of image processing instructions. In the example of FIG. 14, the image instruction(s) being edited is related to scaling, but other image processing instructions could be edited without altering the concept upon which the preferred embodiment is based.

At step 218, the stream editor obtains output, i.e. PDL description from the emitter. Subsequently, with properties programmed by the client user, pursuant to copying the job to the UNIX environment, the editor obtains, at step 220, output document properties. Preferably, these properties are obtained through use of screen 202 (FIG. 12). The editor is then provided, at step 222, with properties regarding a first input page. Preferably, these properties are obtained through use of screen 204 (FIG. 13). If no remote image processing operation is required for the first input page (step 224), then the process proceeds to step 226 where a check is performed to determine if any more input pages require examination.

If, on the other hand, a transformation is required, the transformation is calculated at step 228. Preferably, such calculation includes developing a scaling factor. This may include calculating the factor required to scale a selected side of the input page to a corresponding side of the output page. In one example, to reduce an 8.5×14 input page to an 8.5×11 output page, the scaling factor is 0.78 since that is the amount of scaling required to reduce the long side of the input page. After the scale factor is calculated, the input page is scanned (step 230) and an appropriate location is found (step 232) for editing the page. At step 234, the PDL representation of the page is edited to reflect the request for remote image processing. The editing may include replacing a first Interpress image processing command, e.g. "1—1 SCALE2" with a second Interpress image processing command, e.g. "0.78—0.78 SCALE2". As will be appreciated by those skilled in the art, other editing operations, such as an insert/delete operation may be employed to modify the PDL representation, depending on the type of PDL being edited.

At step 226, the process determines whether any further pages of the input document or job require examination. If more pages remain, the process proceeds to step 236 where the properties of the next input page are provided. When the end of the document is reached, the edited PDL description of the input document is transmitted to the printing system 2 for interpretation, processing and printing.

Figure 15:
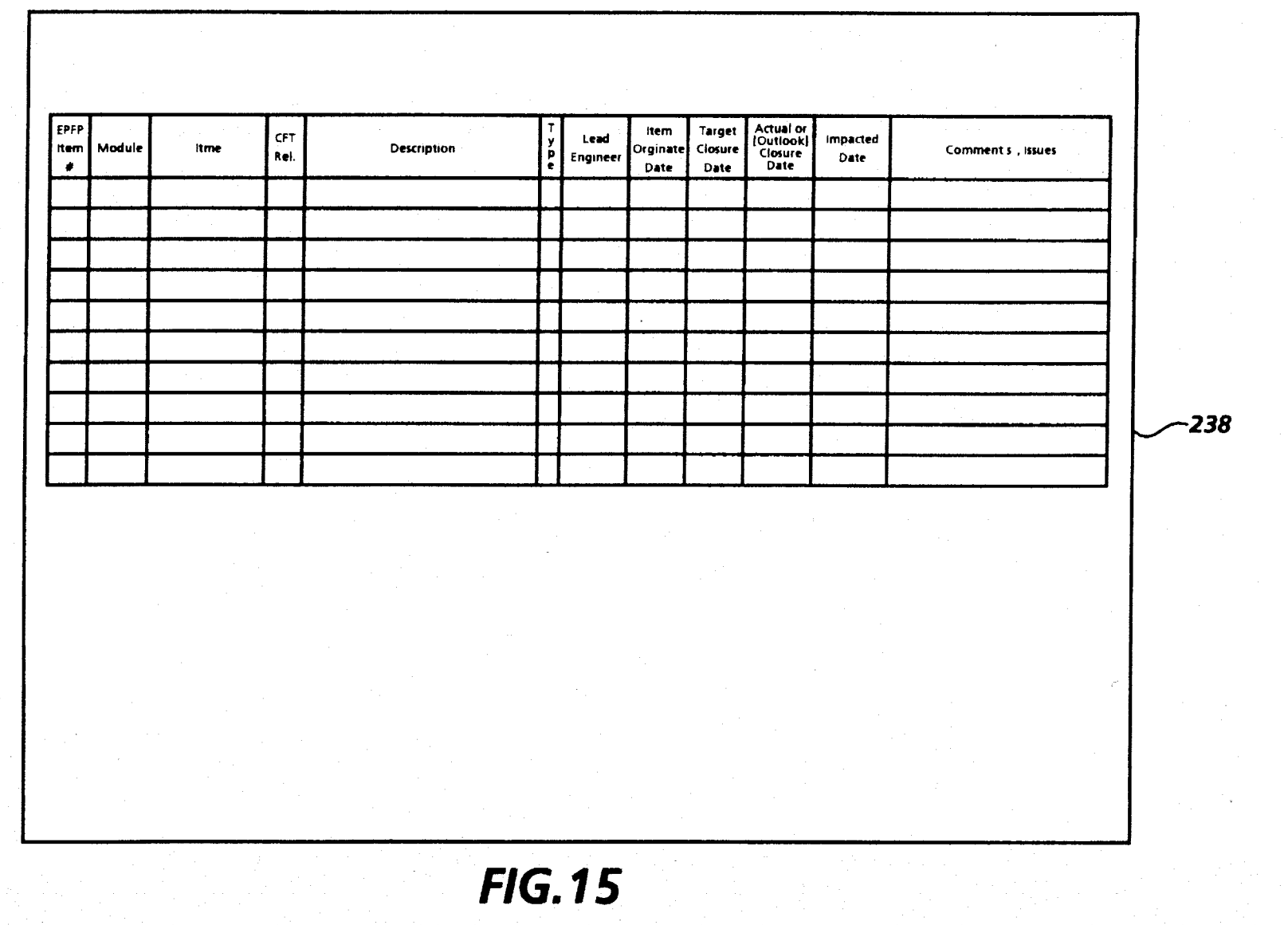
Figure 16:
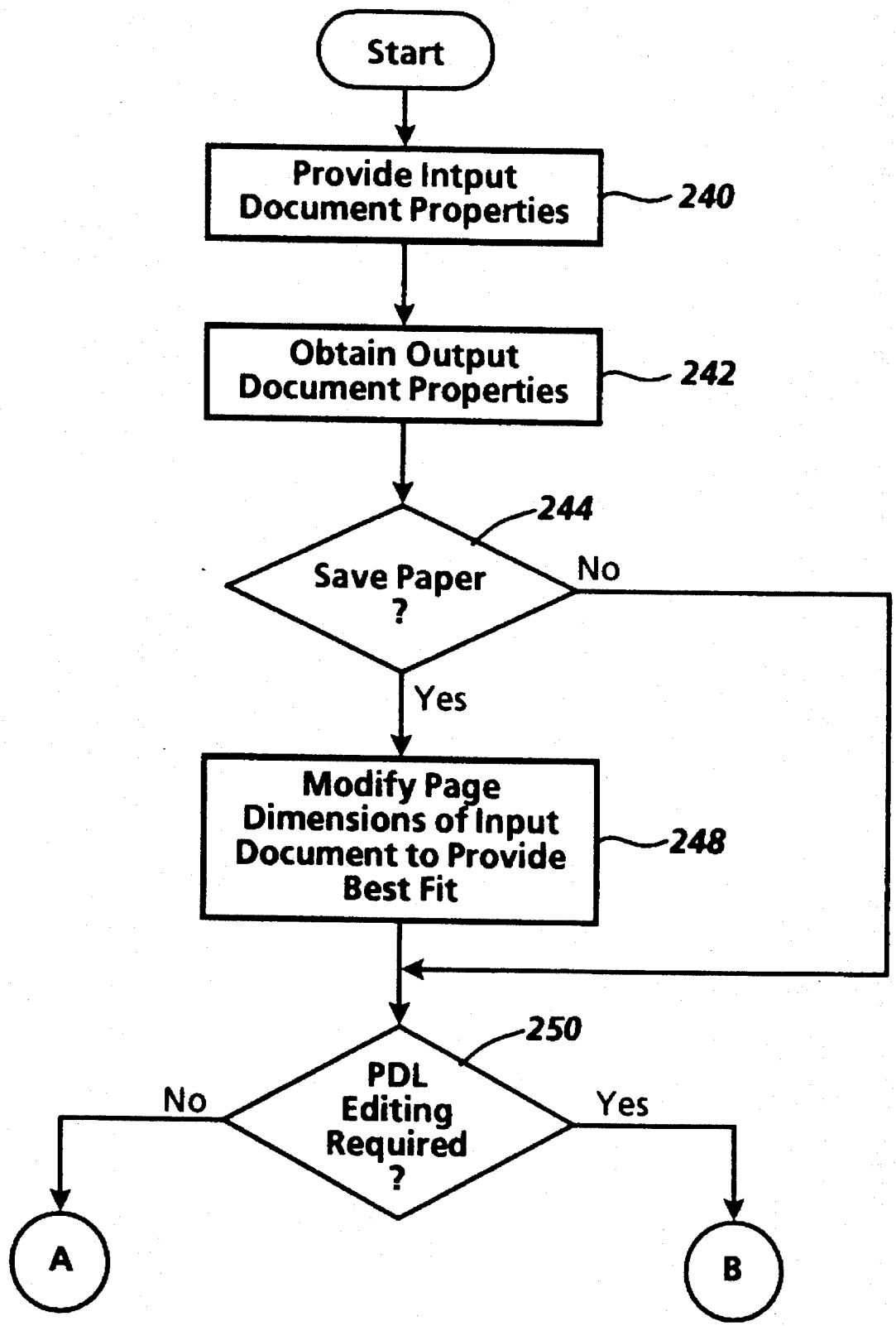
FIG. 16 is a flow diagram illustrating an approach for optimizing the printing of an isomorphically scaled image on a print media sheet.
Figure 17:
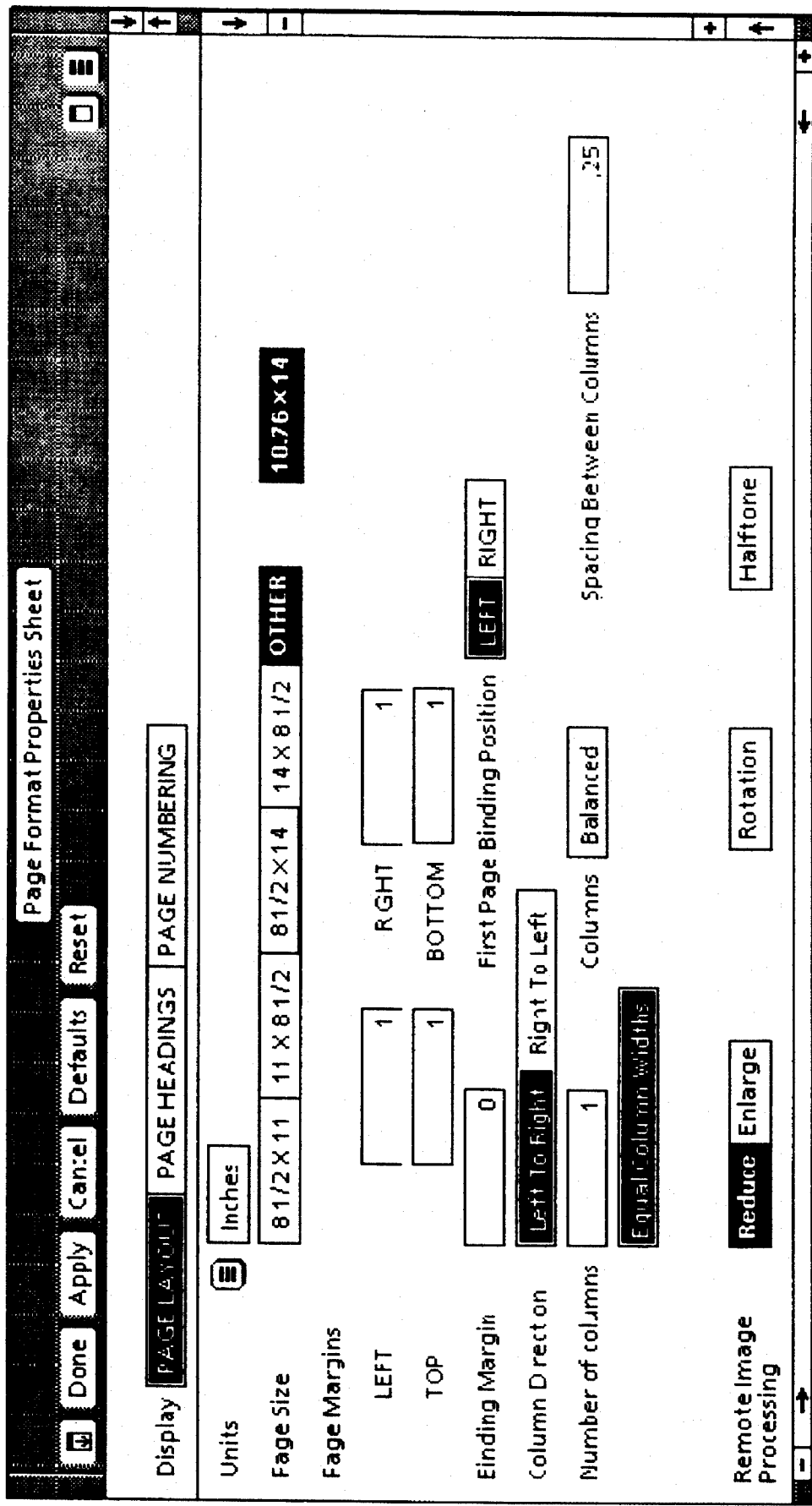
FIG. 17 is an elevational view of a display screen, with a dialog, for programming one or more pages of the input document, with image processing instructions, in accordance with the process of FIG. 16.
Figure 18:
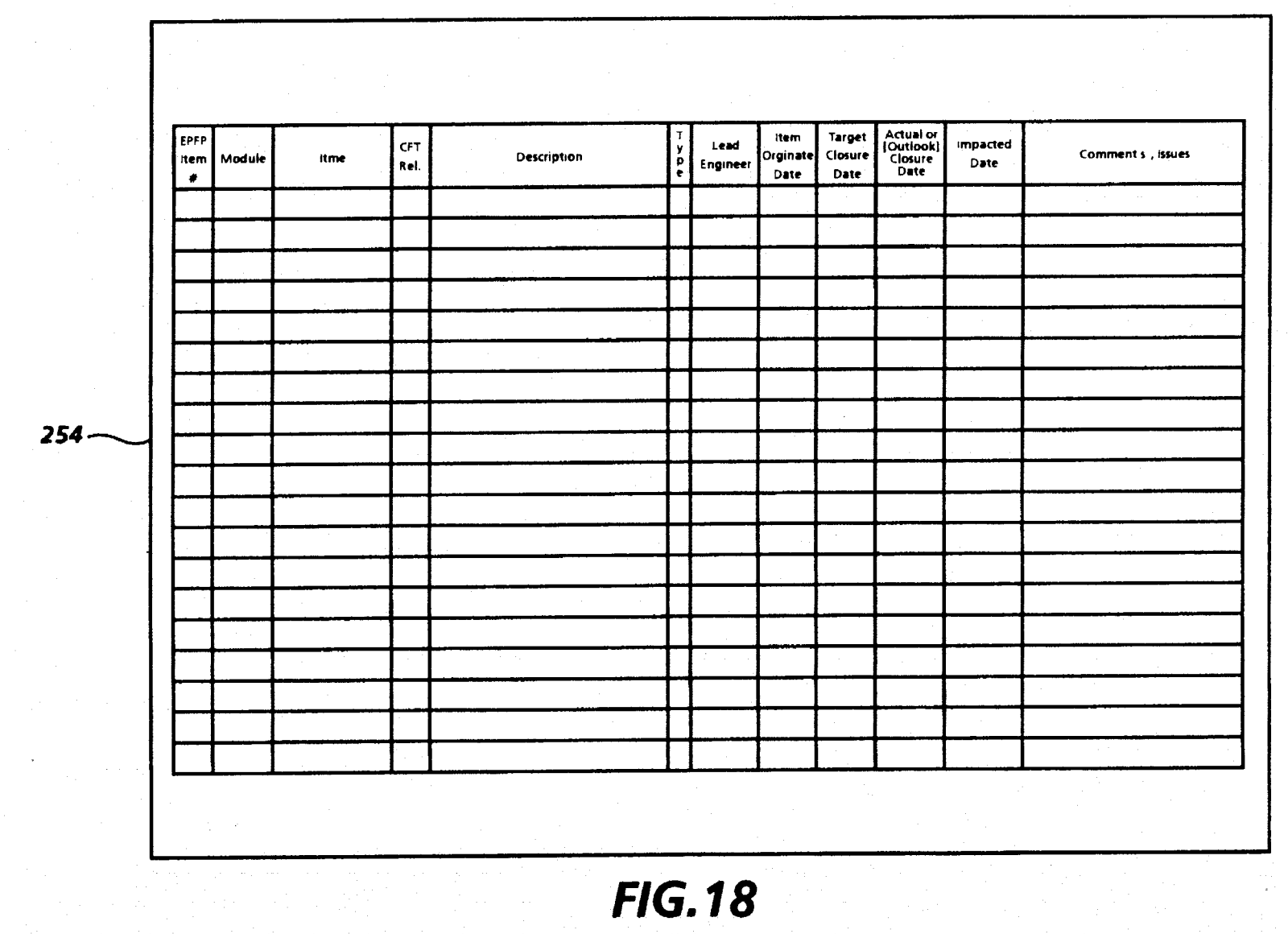

In one example of scaling a single scaling factor is applied to two dimensions of an input page for obtaining a scaled output page. Referring again to FIGS. 12 and 13, in one example, a scaling factor of 0.78 is applied to an 8.5×14 page for scaling it to an 8.5×11. The value of 0.78 is chosen to scale the side of 14" down to approximately 11". In doing this, however, the side of 8.5" is scaled down to about 6.6". Accordingly, as shown in FIG. 15, a resulting output page 238 is not filed up with the original image. Referring to FIGS. 16–18, a technique, which optimizes a remote scaling operation, by filling up the output page with the input image, is discussed.

Referring specifically to FIG. 16, initially, the client user provides the I/O apparatus or workstation, at steps 240, 242 with information regarding the input document properties and the output document properties. The provision of such information is discussed above with respect FIG. 11–14 and accompanying text. In view of such information, the client workstation knows when a remote image processing operation is required. When a remote scaling operation is required (step 244), the client user is provided with an option to save paper. Referring conjunctively to FIGS. 16 and 17, when the client user desires to optimize the remote scaling technique (step 248), the "OTHER" box in the "Page Size" selection of the Page Format Properties Sheet is automatically selected. In turn, this causes other input paper sizes, which optimize the manner in which an output page is filled with input image data, to be provided. In the example of reducing an 8.5×14 input page to an 8.5×11 output page, where a scaling factor of 0.78 is employed, the user is provided with a selection of "10.76×14". With this input size, the image on an output page 254 is about 8.4×10.9 so that, as shown in the illustrated embodiment of FIG. 18, the 8.5×11 output page is substantially filled up. As will be appreciated, the size of the input page is preferably adjusted in accordance with desired output margins for the particular scaling operation being performed. In exiting the routine of FIG. 16, the client is directed, at step 250, to either the routine of FIG. 11 or the routine of FIG. 14.

Various options, among others, can be practiced with the above-described technique. First if an input job includes a plurality of input page with more than two sizes, at least two approaches can be used to obtain a document with one output size. In one example, each input page can be fitted electronically on an output page individually by appropriate programming. Accordingly for an input page of one size, a corresponding scaling factor would be chosen and, for an input page of another size, another corresponding scaling factor would be chosen. In another example, one scaling factor would be used to fit all of the input pages electronically to one size.

Second, an input document with m sizes can be scaled to fit on an output document of n sizes. For example, it may be desired to reduce an input document with both a 18×22 page and an 8.5×14 page to an output document with both a 9×11 page (sometimes referred to as a "cover") and an 8.5×11 page. With the above-described technique, programming for such desired document can be performed readily with the screens of FIGS. 12 and 13.

Third, in certain circumstances, it will be desirable to "auto-fit" the image of an input page onto the substrate of the output page. This can be performed with scaling and translation operations of the type that is present in various electronic printing systems, such as the DocuTech® printing system. As will be appreciated by those skilled in the art, a translation operation may be used to move a reduced input image, in one direction, so that it fits suitably on the output page. Auto-fit is achieved by simply translating the input image in two directions, when necessary.

Finally, while scaling, in the preferred embodiment, is performed isomorphically, anamorphic scaling could be employed without altering the concept upon which the present technique is based. As will be appreciated, for those cases employing anamorphic scaling, suitable programming would be built into the screens of FIGS. 12 and 13.

Numerous features of the above-described technique will be appreciated by those skilled in the art: First, the technique permits image processing, e.g. scaling, rotating, translating and halftoning, to be performed, by a client user, at a printing system, the printing system being disposed remotely of the client user. Performing image processing in this manner is advantageous in at least three respects. In one respect, the user client may gain access to image processing capability that would not normally be available to the client user. For example, a given client user user may not be able to obtain scaling at his/her input or workstation, but through use of the present technique, she can obtain such scaling at the remote printing system.

In another respect, the user client may gain access to superior image processing through exploitation of the remote printing system. For example, the DocuTech network printing system possesses relatively superior halftoning capability. Through use of the present technique, the client user can take advantage of such image processing feature. Additionally, a network client may call for an image processing operation, such as resolution conversion, when s/he knows that an output device provides a superior feature which would not normally be available at the client. For example, the client may call for a resolution conversion when it is known that a remote printer has a higher output resolution than the input resolution provided by the client. Alternatively, the remote user can accommodate for deficiencies of a remote printer. In one example, the user may be required to adjust halftoning for accommodating to the fact that the printer does not provide as many halftone levels as the remote client.

In yet another respect, the client is provided with the opportunity to work with one character size (on an input end) and print with another character size (on an output end). Accordingly, in one example, a relatively large character size can be used to develop a table, on a relatively large electronic input page, and a reduced representation of that page can then be printed on a print media sheet that is considerably smaller, in designated size, than the electronic input page. In this example, the character size of the print media, while still readily readable, is considerably smaller than the character size used to develop the table at the input end. As will be appreciated, a client may find it convenient to create documents in a particular page size and print them on another page size.

Second, the technique is particularly flexible in that it can be performed independent of emitter constraints. That is, in one embodiment the emitter is adapted to convert image processing related instructions, programmed by the client user, into a PDL description. On the other hand, if the emitter is not adapted to perform such conversion, an editor can be employed to modify PDL commands so that remote image processing can be obtained. Through use of the editor, the PDL commands can be modified at any location between the client user input and a destination printing machine.

Finally, the technique can be employed in a manner that 1) reduces the size of paper used and 2) reduces the number of pages used. Regarding pt. 1), in one example, 14" documents are printed directly onto 11" stock to maximize image quality. Such printing is preferable to the less efficient approach of reducing a 14" document on a copier. Regarding pt. 2), by, in one example, adjusting the size of input documents more print can be fitted on an output page. This can result in cost savings even when only one input page is reduced.

What is claimed is:

1. In a printing system with an input source communicating with a printing machine by way of a network connection, the printing machine including an image processing arrangement for performing one or more image processing operations, the input source including an emitter in which a first electronic document, represented by a plurality of electronic pages, is prepared for an output operation at the printing machine, a method comprising:

programming an electronic job ticket with a plurality of instructions, for processing the first electronic document, a selected one of the instructions corresponding with an image processing operation to be performed on a selected one of the electronic pages;

using the emitter to convert the first electronic document, with the electronic job ticket, into a second electronic document written in a page description language, the second electronic document including respective page description language representations of the selected instruction and the selected electronic page;

transmitting, by way of the network connection, the second electronic document to the printing machine;

interpreting the second electronic document at the printing machine to create an output-ready document, said interpreting including performing the image processing operation, on the page description language representation of the selected electronic page, with the page description language representation of the selected instruction of the second electronic document; and outputting a representation of the interpreted second electronic document at the printing machine.

2. The method of claim 1, wherein said outputting comprises producing a plurality of prints, representative of the first electronic document, in response to said interpreting of the second electronic document.

3. The method of claim 1, in which the page description language representation of the selected electronic page corresponds with an image and the image is halftoned, wherein said performing includes adjusting a degree to which the image is halftoned.

4. The method of claim 1, in which a portion of the page description language representation of the selected electronic page corresponds with an image of a fist size, wherein said performing comprises scaling the image from the first size to a second size.

5. The method of claim 4, wherein:

said programming includes:
inputting, at the input source, the first size and the second size, and
determining a scaling factor based on a relationship between the first size and the second size; and said scaling includes scaling the image with the scaling factor.

6. The method of claim 5, in which the first size includes a dimension with a magnitude, wherein said inputting includes adjusting the dimension magnitude so that, upon printing a representation of the image on a print media sheet, a fit of the printed image representation, relative to the print media sheet, is optimized.

7. The method of claim 4, further comprising translating the image, relative to a selected electronic print media sheet, so that a selected relationship exists between the image and the selected electronic print media sheet.

8. The method of claim 4, in which the second electronic document includes a page description language representation of a selected electronic page corresponding with a second image of a third size and a page description language representation of a second image processing instruction, wherein:

said programming includes:
inputting, at the input source, the third size and a fourth size,
determining a first scaling factor based on a relationship between the third size and the fourth size; and
scaling the third size to the fourth size with the first scaling factor and the page description language representation of the second image processing instruction.

9. The method of claim 8, further comprising configuring the second size to be equivalent to the fourth size.

10. The method of claim 8, in which the first size is scaled to the second size with a second scaling factor, further comprising configuring the first scaling factor to be equivalent to the second scaling factor.

11. The method of claim 1, in which the page language representation of the first selected electronic page is associated with a font call and the the printing machine includes a scalable outline font, wherein said performing includes scaling the scalable outline font in accordance with the page language representation of the selected instruction.

12. The method of claim 1, in which the page description language representation of the selected electronic page corresponds with a set of image signals, further comprising generating the set with the input source, the set being interpreted for use in producing prints representative of the first electronic document.

13. In a printing system with an input source communicating with a printing machine by way of a network connection, the printing machine including an image processing arrangement for performing one or more image processing operations, the input source including an emitter in which a first electronic document, represented by a plurality of electronic pages, is prepared for an output operation at the printing machine, a method comprising:

programming an electronic job ticket with a plurality of instructions, for processing the first electronic document, a first selected one of the instructions corresponding with an image processing operation to be performed on a selected one of the electronic pages;

using the emitter to convert the first electronic document, with the electronic job ticket, into a second electronic document written in a page description language, the second electronic document including respective page description language representations of the first selected instruction and the selected electronic page;

editing the second electronic document for altering the page description language representation of the first selected instruction to a page description representation of a second selected instruction;

transmitting, by way of the network connection, the second electronic document to the printing machine;

interpreting the second electronic document at the printing machine to create an output-ready document, said interpreting including performing the image processing operation, on the page description language representation of the selected electronic page, with the page description language representation of the second selected instruction of the second electronic document; and outputting a representation of the interpreted second electronic document at the printing machine.

14. The method of claim 13, wherein said editing includes deleting first selected instruction and replacing it with the second selected instruction.

15. The method of claim 13, further comprising performing said editing with a page description language stream editor.

16. The method of claim 13, in which the page description language representation of the second selected electronic page corresponds with an image of a fist size, wherein said performing comprises scaling the image from the first size to a second size.

17. The method of claim 16, wherein:

said programming includes:
inputting, at the input source, the first size and the second size, and
determining a scaling factor based on a relationship between the first size and the second size; and said scaling includes scaling the image with the scaling factor.

18. The method of claim 17, in which the first size includes a dimension with a magnitude, wherein said inputting includes adjusting the dimension magnitude so that, upon printing a representation of the image on a print media sheet, a fit of the printed image representation, relative to the print media sheet, is optimized.

19. A printing system with an input source communicating with a printing machine by way of a network connection, the printing machine including an image processing arrangement for performing one or more image processing operations, the input source including an emitter in which a first electronic document, represented by a plurality of electronic pages, is prepared for an output operation at the printing machine, comprising:

- a user interface for programming an electronic job ticket with a plurality of instructions to process the first electronic document, a selected one of the instructions corresponding with an image processing operation to be performed on a selected one of the electronic pages;
- an emitter for converting the first electronic document, with the electronic job ticket, into a second electronic document written in a page description language, the second electronic document including respective page description language representations of the selected instruction and the selected electronic page;
- a transmitter for transmitting the second electronic document from said emitter to the printing machine; and
- a job decomposer for interpreting the second electronic document at the printing machine to create an output-ready document, said decomposer performing the image processing operation, on the page description language representation of the selected electronic page, with the page description language representation of the selected instruction of the second electronic document, wherein the printing machine outputs a representation of the interpreted second electronic document.

20. The printing system of claim 19, in which a portion of the page description language representation of the selected electronic page corresponds with an image of a fist size, wherein the image is scaled from the first size to a second size.

21. The printing system of claim 20, wherein:

- the first size and the second size are inputted at the input source;
- a scaling factor, based on a relationship between the first size and the second size, is determined; and
- the image is scaled with the scaling factor.

22. The printing system of claim 21, in which the first size includes a dimension with a magnitude, wherein the dimension magnitude is adjusted so that, upon printing a representation of the image on a print media sheet, a fit of the printed image representation, relative to the print media sheet, is optimized.

23. A printing system with an input source communicating with a printing machine by way of a network connection, the printing machine including an image processing arrangement for performing one or more image processing operations, the input source including an emitter in which a first electronic document, represented by a plurality of electronic pages, is prepared for an output operation at the printing machine, comprising:

- a user interface for programming an electronic job ticket with a plurality of instructions to process the first electronic document, a selected one of the instructions corresponding with an image processing operation to be performed on a selected one of the electronic pages;
- an emitter for converting the first electronic document, with the electronic job ticket, into a second electronic document written in a page description language, the second electronic document including respective page description language representations of the selected instruction and the selected electronic page;
- a stream editor for altering the page description language representation of the first selected instruction to a page description representation of a second selected instruction;
- a connection, operatively coupling said emitter with the printing machine, for transmitting the second electronic document from said emitter to the printing machine; and
- a job decomposer for interpreting the second electronic document at the printing machine to create an output-ready document, said decomposer performing the image processing operation, on the page description language representation of the selected electronic page, with the page description language representation of the second selected instruction of the second electronic document, wherein the printing machine outputs a representation of the interpreted second electronic document.

24. The printing system of claim 23, in which a portion of the page description language representation of the selected electronic page corresponds with an image of a first size, wherein the image is scaled from the first size to a second size.

25. The printing system of claim 24, wherein:

- the first size and the second size are inputted at the input source;
- a scaling factor, based on a relationship between the first size and the second size, is determined; and
- the image is scaled with the scaling factor.

26. The printing system of claim 25, in which the first size includes a dimension with a magnitude, wherein the dimension magnitude is adjusted so that, upon printing a representation of the image on a print media sheet, a fit of the printed image representation, relative to the print media sheet, is optimized.

27. The printing system of claim 23, where said stream editor is disposed remotely of said emitter.

* * * * *